US011619972B2

(12) United States Patent
Morgan (10) Patent No.: US 11,619,972 B2
(45) Date of Patent: Apr. 4, 2023

(54) MODULAR EMBEDDED COMPUTE APPLIANCE DOCKING BOARD, AND METHODS AND SYSTEMS FOR THE SAME

(71) Applicant: Management Services Group, Inc., Virginia Beach, VA (US)

(72) Inventor: Thomas Scott Morgan, Virginia Beach, VA (US)

(73) Assignee: Management Services Group, Inc., Virginia Beach, VA (US)

( * ) Notice: Subject to any disclaimer, the term of this patent is extended or adjusted under 35 U.S.C. 154(b) by 0 days.

(21) Appl. No.: 17/466,401

(22) Filed: Sep. 3, 2021

(65) Prior Publication Data

US 2022/0050503 A1 Feb. 17, 2022

Related U.S. Application Data

(63) Continuation of application No. 16/896,634, filed on Jun. 9, 2020, now Pat. No. 11,126,225, which is a continuation of application No. 16/788,877, filed on Feb. 12, 2020, now Pat. No. 10,712,778.

(60) Provisional application No. 62/925,789, filed on Oct. 25, 2019.

(51) Int. Cl.
| | |
|---|---|
| *G06F 1/16* | (2006.01) |
| *G06F 21/44* | (2013.01) |
| *G06F 1/18* | (2006.01) |
| *G06F 1/26* | (2006.01) |

(52) U.S. Cl.
CPC ............ *G06F 1/1632* (2013.01); *G06F 1/189* (2013.01); *G06F 1/266* (2013.01); *G06F 21/44* (2013.01)

(58) Field of Classification Search
CPC ........ G06F 1/1632; G06F 1/189; G06F 1/266; G06F 21/44; Y02D 10/00
See application file for complete search history.

(56) References Cited

U.S. PATENT DOCUMENTS

| | | | |
|---|---|---|---|
| 5,463,742 | A | 10/1995 | Kobayashi |
| 5,550,710 | A | 8/1996 | Rahamim et al. |
| 5,774,330 | A | 6/1998 | Melton et al. |
| 5,861,873 | A | 1/1999 | Kikinis |
| 6,052,276 | A | 4/2000 | Do et al. |
| 6,098,131 | A | 8/2000 | Unger et al. |
| 6,747,878 | B1 | 6/2004 | Hipp et al. |
| 7,139,914 | B2 | 11/2006 | Arnouse |

(Continued)

*Primary Examiner* — Glenn A. Auve
(74) *Attorney, Agent, or Firm* — Cooley LLP (57) ABSTRACT

A docking board removably coupled to a processor board that does not function when not operatively coupled to the docking board. The docking board sends power to and receive a control signal from the processor board when operatively coupled to the processor board and does not send power and does not receive a control signal when not operatively coupled to the processor board. The docking board is removably coupled to an expansion board that performs a computer function that is not performed by the processor board and the docking board. The docking board sends power and a control signal to the expansion board when the docking board is operatively coupled to the processor board and the expansion board, and does not send power and does not send a control signal to the expansion board when the docking board is not operatively coupled to the processor board and the expansion board.

20 Claims, 5 Drawing Sheets

(56) References Cited

U.S. PATENT DOCUMENTS

| | | |
|---|---|---|
| 7,239,509 B1 | 7/2007 | Roeske |
| 7,472,275 B2 | 12/2008 | Arnouse |
| 7,516,484 B1 | 4/2009 | Arnouse |
| 7,533,408 B1 | 5/2009 | Arnouse |
| 7,593,723 B2 | 9/2009 | Zarom |
| 9,010,645 B2 | 4/2015 | Arnouse |
| 10,235,323 B2 | 3/2019 | Arnouse |
| 10,712,778 B1 | 7/2020 | Morgan |
| 11,126,225 B2 * | 9/2021 | Morgan .................... G06F 1/26 |
| 2003/0125107 A1 | 7/2003 | Cannon |
| 2003/0154291 A1 | 8/2003 | Ocheltree et al. |
| 2003/0188067 A1 | 10/2003 | Okin |
| 2005/0021870 A1 | 1/2005 | Carnahan et al. |
| 2006/0136622 A1 | 6/2006 | Rouvelin et al. |
| 2007/0239963 A1 | 10/2007 | Yao et al. |
| 2021/0124394 A1 | 4/2021 | Morgan |

* cited by examiner

Send power from a docking board to a processor board when the docking board and the processor board are operatively coupled together, the processor board not functioning and the docking board not sending power to the processor board when the docking board and the processor board are not operatively coupled together 401

↓

Receive a control signal at the docking board from the processor board when the docking board and the processor board are operatively coupled together, the docking board not receiving a control signal when not operatively coupled to the processor board 402

↓

Send power and a control signal from the docking board to a first expansion board when the docking board and the processor board are operatively coupled together, the first expansion board is configured to perform a computer function that is not performed by the processor board and the docking board 403

↓

Do not send power and a control signal from the docking board to the first expansion board when the docking board is not operatively coupled to the processor board and the first expansion board 404

↓

Authenticate, at the docking board, the processor board in response to the processor board being operatively coupled to the docking board 455

↓

Send the control signal from the docking board to the processor board after the processor board is authenticated 456

↓

Do not send the control signal from the docking board to the processor board before the processor board is authenticated 457

↓

Authenticate, at the docking board, the expansion board in response to the expansion board being operatively coupled to the docking board 405

↓

Send the control signal from the docking board to the expansion board after the expansion board is authenticated 406

↓

Do not send the control signal from the docking board to the expansion board before the expansion board is authenticated 407

FIG. 4

MODULAR EMBEDDED COMPUTE APPLIANCE DOCKING BOARD, AND METHODS AND SYSTEMS FOR THE SAME

CROSS REFERENCE TO RELATED APPLICATION

This application is a continuation of U.S. application Ser. No. 16/896,634, filed Jun. 9, 2020, entitled "Modular Embedded Compute Appliance Docking Board, and Methods and Systems for the Same", now U.S. Pat. No. 11,126,225, which is a continuation of U.S. application Ser. No. 16/788,877, filed Feb. 12, 2020, entitled "Modular Embedded Compute Appliance Docking Board, and Methods and Systems for the Same", now U.S. Pat. No. 10,712,788, which claims priority to and the benefit of U.S. Provisional Application No. 62/925,789, filed Oct. 25, 2019 and entitled "Modular Embedded Compute Appliance Docking Board," each of which is incorporated herein by reference in its entirety.

TECHNICAL FIELD

The present disclosure relates to the field of computers/digital processing systems, and in particular to methods and apparatus related to a docking board, to which portable expansion boards can be securely attached to form a modern computer.

BACKGROUND

A modular compute appliance can be a useful form of a computer for a number of reasons. For example, a modular function-based compute appliance can be easier to produce by separately producing each function-based board. Moreover, a modular function-based compute appliance can be advantageously produced by specialized focus on design of each function-based board rather than a general effort on managing invasive complexity of a multifunctional dense computer boards.

Dense computer boards generate greater electrical noise, thermal noise, and electromagnetic interference compared to less dense computer boards. Moreover, it can be invasive and expensive to improve a design of a dense computer board to reduce its electrical noise, thermal noise, electromagnetic interference, and other deficiencies from its initial stage design of the dense computer board. Therefore, design deficiencies of dense computer boards that lead to electrical noise, thermal noise, and electromagnetic interference often remain in the dense computer boards as persistent product defects.

Design of dense computer boards typically involves planning about functions to be supported by the dense computer boards. Planning has been an effective approach in known design approaches for the dense computer boards that have large power supplies. In design of non-modular portable computers and embedded systems where design area of their board is limited, cost effectiveness and performance of the portable computers and the embedded systems are reduced.

Known embedded computers each typically includes a processor, a memory, a storage, a networking component(s), and other peripherals soldered on or directly connected to a main board (also called "the motherboard"). Increased noise levels in the form of an electrical noise, a thermal noise, an electromagnetic interference, and other deficiencies can manifest in degraded performance of embedded computers. Thus, a need exists for a cleaner and more modular approach, which allows for a different primary function for each function-based peripherals connected to that board.

SUMMARY

A docking board is removably couplable to a processor board that does not function when not operatively coupled to the docking board. The docking board sends power to and receives a control signal from the processor board when operatively coupled to the processor board and does not send power and does not receive a control signal when not operatively coupled to the processor board. The docking board is removably couplable to an expansion board that performs a computer function that is not performed by the processor board and the docking board. The docking board sends power and a control signal to the expansion board when the docking board is operatively coupled to the processor board and the expansion board, and does not send power and does not send a control signal to the expansion board when the docking board is not operatively coupled to the processor board and the expansion board.

DETAILED DESCRIPTION

Non-limiting examples of various aspects and variations of the embodiments are described herein and illustrated in the accompanying drawings.

One or more embodiments described herein generally relate to embedded computers, and in particular, methods, apparatus, and systems that use a modular compute appliance to increase quality, simplicity of production, cost effectiveness, and engineering quality of the total system. Modular design reduces possible design requirements and reduces costs associated with designs of more complex systems. Modular design further enables a more specialized approach in designing expansion boards. Methods and systems of modular embedded compute appliance docking board are disclosed.

Described herein are modular compute appliances that are suitable for highly reliable and secure portable computer systems. Function-based boards of the compute appliance can be as small as a card (e.g., a credit card, an access key card, etc.) as to be easily carried in pockets or wallets. Function-based boards can be dependent on a docking board for power supply and control signals from a processor board. On the other hand, the modular compute appliances can be dependent on function-based boards for board specific functions such as networking, memory, encryption, virtual reality, and so forth. Function-based boards, given their compact form factor and function-specific design, can achieve high signal integrity (SI) for power and signals sent between the docking board and the function-based boards.

Embodiments described herein provide methods and systems for organizing a modular compute appliance (also referred to herein as a portable computer) into function-based boards. Function-based boards can have different portable sizes (e.g., size of a credit card, size of a smartphone screen, etc.), can have different functions (e.g., networking, satellite communication, additional storage, etc.), and can be removably coupled to a docking board. Modularizing the portable computer allows manufacturers of each function-based board to have a specialized and flexible approach in design of a specific function of the function-based board, without redesigning the modular compute appliance for different computers.

Figure 1A:
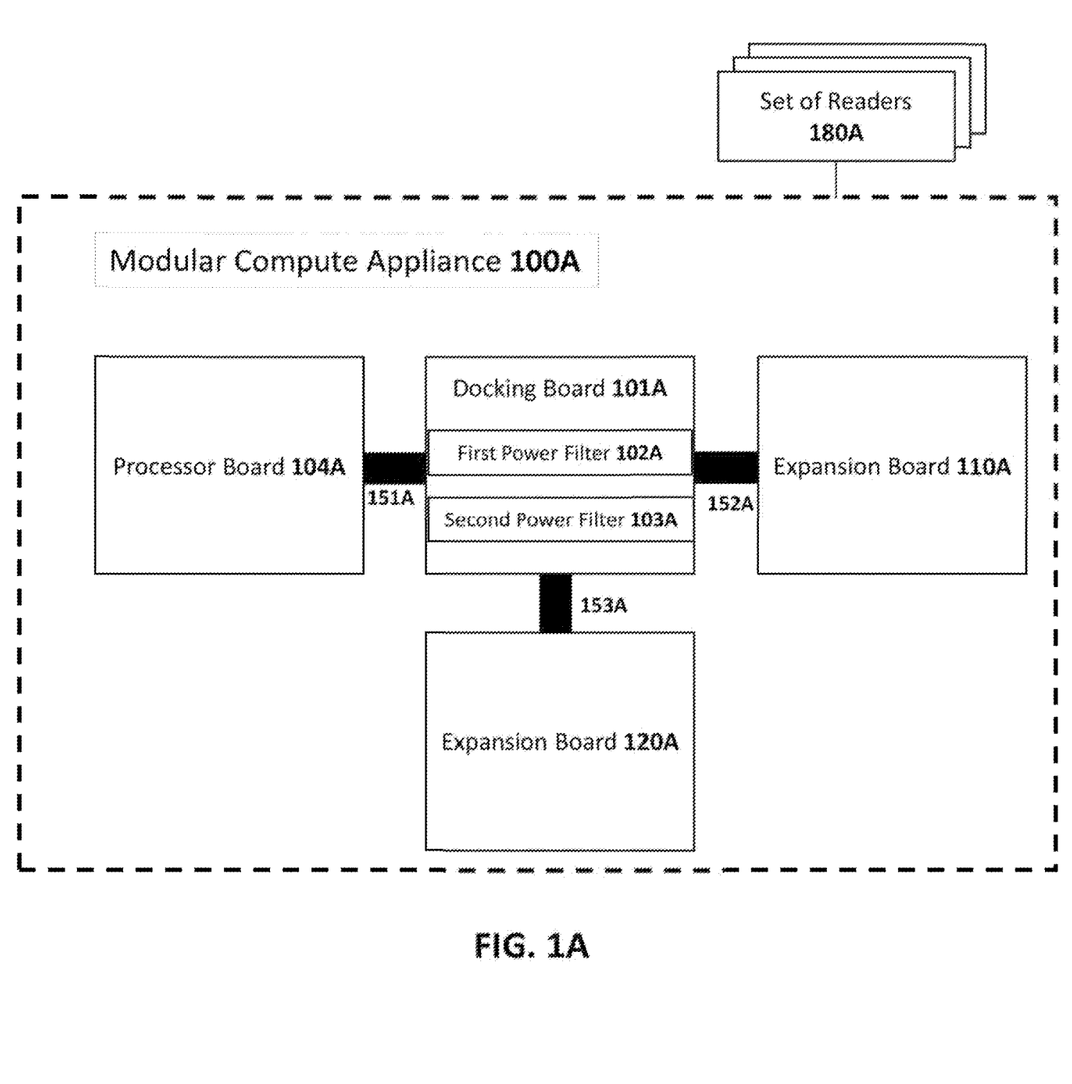
FIG. 1A is a schematic description of a portable computer, according to an embodiment.

FIG. 1A is a schematic description of a modular compute appliance (also referred to herein as a "portable computer") 100A, according to an embodiment. The modular compute appliance 100A can include the docking board 101A, the processor board 104A, the expansion board 110A, and/or an expansion board 120A. The docking board 101A can be configured to be operatively coupled to the processor board 104A, the expansion board 110A, and/or the expansion board 120A through a system bus (for example, address bus, data bus, and/or control bus, not shown). The docking board 101A can be used to send power (e.g., a direct current (DC) electric power, an alternating current (AC) electric power, etc.) and receive a set of signals (e.g., a DC electric signal, an AC electric signal, an radio frequency (RF) signal etc.) in response to a processor board (e.g., a central processing unit (CPU) board, etc.) being coupled or in response to an expansion board (e.g., a memory board, etc.) being coupled. For example, the docking board 101A can include a processor or controller (not shown) to control the sending of power, receiving signals, etc. as described herein. The modular compute appliance 100A can include, in addition to the docking board 101A, a set of function-based boards including a processor board 104A and/or an expansion board 110A. The modular compute appliance 100A can be connected to a set of readers 180A (also referred to herein as "the set of peripheral devices" and "peripherals") via a connector(s) (not shown in FIG. 1A).

The docking board 101A can include a power supply or be removably coupled to a power supply. The docking board 101A has full control of power distribution between the boards within the modular compute appliance 100A. For example, a processor or controller of the docking board 101A can send power to processor board 104A and/or the expansion board 110A. In some implementations, the docking board 101A can send a first power to the processor board 104A and/or the expansion board 110A to authenticate the processor board 104A and/or the expansion board 110A (e.g., send the first power to an authentication circuit, such as an integrated circuit (IC) chip that performs the authentication). The first power can be sent in response to the processor board 104A and/or the expansion board 110A being operatively coupled to the docking board 101A. The docking board 101A can send a second power, different than the first power (e.g., different in power magnitude, in voltages, or in currents), to the processor board 104A and/or the expansion board 110A after and/or in response to authenticating the processor board 104A and/or the expansion board 110A to operate them in full capacity. For example, the first power can be 3 vdc and used to authenticate the processor board and/or expansion board, and the second power can be 5 vdc for operating the processor board and/or expansion board. For another example, the first power can 12 vdc and the second power can be 5 vdc. For yet another example, the first power can be 5 vdc at 400 ma current and the second power can be 5 vdc at 500 ma current. For yet another example, the first power can be 5 vdc at 500 ma current and the second power can be 50 vdc at 500 ma current. Thus, the first power and the second power can differ by any of the voltage, current and/or wattage.

In some other implementations, the docking board 101A can send power to the processor board 104A and/or the expansion board 110A to authenticate the processor board 104A and/or the expansion board 110A. For example, the power can be sent to an authentication circuit such as an integrated circuit (IC) chip that performs the authentication. The power can be sent in response to the processor board 104A and/or the expansion board 110A being operatively coupled to the docking board 101A. In such implementations, power is not sent to remaining portions of the processor board 104A and/or the expansion board 110A until the authentication circuit has authenticated the respective board. After the authentication circuit has authenticated the respective board, the power can be sent to the remaining portions of the processor board 104A and/or the expansion board 110A.

The docking board 101A can include a first power filter 102A and a second power filter 103A. The docking board 101A can supply power to the function-based boards (such as expansion boards 110A and 120A), and can be configured further to facilitate a set of peripheral boards (also referred to herein as "the set of readers") via, for example, a set of memory buses, a set of signal receivers, a set of signal transmitters, a set of wired networking, a set of wireless networking, a set of optical networking, a set of video systems, a set of monitors, and/or the like (not shown in FIG. 1A).

The docking board 101A can be configured to facilitate, instead of or in addition to the set of peripheral boards, a set of peripheral connectors such as for example, a universal serial bus (USB) connector(s), a USB 2.0 connector(s), a USB 3.0 connector(s), a mini USB connector(s), a micro USB connector(s), a USB-c connector(s), a high definition multimedia interface (HDMI) connector(s), a video graphics array connector(s), a general purpose input/output (GPIO) connector(s), a general purpose interface bus (GPIB or IEEE-488) connector(s), and/or the like. The set of peripheral connectors can be a power or signal medium that connects to a set of connector interfaces. The set of connector interfaces can be integrated in the docking board 101A and/or can be integrated in a peripheral board from the set of peripheral boards. In one example, a peripheral connector (e.g., a copper wire having two ends and with one male USB connector at each end) can have a corresponding type A USB 3.0 receptacle (female connector) located at the docking board 101A and a type A USB 3.0 receptacle at a peripheral such as a projector video system.

The processor board 104A can include, for example, a hardware-based integrated circuit (IC) or any other suitable processing device configured to run or execute a set of instructions or a set of codes. For example, the processor board 104A can include a general purpose processor, a central processing unit (CPU), an accelerated processing unit (APU), an application specific integrated circuit (ASIC), a field programmable gate array (FPGA), a programmable logic array (PLA), a complex programmable logic device (CPLD), a programmable logic controller (PLC), a graphics processing unit (GPU), and/or the like. The processor board 104A can additionally include a memory, such as, for example, a CPU cache memory or a random-access memory (RAM). Including the memory on the processor board 104A can allow reduce average time and/or average energy used to process data. The general-purpose processor can be operatively coupled to the memory through a system bus (for example, address bus, data bus, and/or control bus, not shown).

The expansion board 110A and/or the expansion board 120A can include a hardware-based IC or can be any other suitable electronic board configured to provide at least one functionally. In one embodiment, the expansion board 110A or the expansion board 120A can have one function such as, for example, networking, storage, and/or the like. In one embodiment, the expansion board 110A and/or the expansion board 120A can have multiple functions such as, for example, networking and streaming, storage and authenticating, and/or the like. The flexibility of having one or more functions on the expansion board 110A and/or the expansion board 120A allows flexibility in circuit and overall system design.

The set of readers 180A can be set of ancillary devices used to input information to the modular compute appliance 100A or output information from the modular compute appliance 100A. The set of readers 180A can include, for example, a keyboard(s), a mouse(s), a monitor(s), a webcam(s), a microphone(s), a touch screen(s), a printer(s), a scanner(s), a virtual reality (VR) head-mounted display, a speaker(s), a headphone(s), a gamepad(s), a joystick(s), a biometric reader(s), and/or the like (not shown).

The modular compute appliance 100A can connect the docking board 101A, via a set of high signal integrity (SI) power and signal connectors, to the processor board 104A, the expansion board 110A, and/or the expansion board 120A. A high SI power and signal connectors 151A can connect the processor board 104A to the docking board 101A, a high SI power and signal connectors 152A can connect the expansion board 110A (e.g., additional networking board) to the docking board 101A, and/or a high SI power and signal connectors 153A can connect the expansion board 120A (e.g., additional storage board and additional networking board) to the docking board 101A.

In some implementations, the high SI power and signal connectors 151A can establish a connection between the processor board 104A and the docking board 101A for information processing and providing power to operate the processor board 104A. The information processing can be done by, for example, a processor board that synchronizes and controls operations of the modular compute appliance 100A, the expansion board 101A, the expansion board 120A, and/or the set of readers 180A. When the connection between the processor board 104A and the docking board 101A is established, the processor board 104A and the docking board 101A are then operatively coupled in the sense that the docking board 101A can send power to the processor board 104A and the processor board 104A can send a set of control signals to the docking board 101A. The connection between the processor board 104A and the docking board 101A is removable in the sense that the processor board 104A, when removed from the docking board 101A, is not operatively coupled, does not receive power from the docking board 101A, does not send control signal to the docking board 101A and does not function. In one example, the docking board 101A is the only source of power to the processor board 104A, and removing the processor board 104A from the docketing board 101A stops operation of the expansion board 104A to an extent that the expansion board 110A cannot operate alone without being removably connected to the docking board 101A.

In some implementations, the high SI power and signal connectors 152A establish a connection between the expansion board 110A to the docking board 101A, such that the expansion board 110A is removably coupled to the docking board 101A. The expansion board 110A can be added for example to provide networking function when the expansion board 110A is operatively coupled to the docking board 101A. The additional networking function can be, for example, a wireless router board that acts as a mobile Wi-Fi™ hotspot. When the connection between the expansion board 110A and the docking board 101A is established, the expansion board 110A and the docking board 101A are then operatively coupled, in the sense that the docking board 101A can be configured to send power and direct a control signal from the processor board 104A to the expansion board 110A and the expansion board 110A can send a set of networking signals to the docking board 101A. The connection between the expansion board 110A and the docking board 101A is removable in the sense that the expansion board 110A, when removed from the docking board 101A, is not operatively coupled, does not receive power and/or control signal from the docking board 101A, and does not send networking signals to the docking board 101A. In one example, the docking board 101A is the only source of power to the expansion board 110A and removing the expansion board 110A stops operation of the expansion board 110A to an extent that the expansion board 110A cannot operate alone without being removably connected to the docking board 101A.

In some implementations, the high SI power and signal connectors 153A establish a connection between the expansion board 120A to the docking board 101A, such that the expansion board 120A is removably coupled to the docking board 101A. The expansion board 120A can be added to provide storage function when the expansion board 120A is operatively coupled to the docking board 101A. The additional storage function can be, for example, a solid-state storage board that acts as a database. After the connection between the expansion board 120A and the docking board 101A is established, the expansion board 120A and the docking board 101A are then operatively coupled, in the sense that the docking board 101A can send power and direct a control signal from the processor board 104A to the expansion board 110A and the expansion board 110A can send a set of data transfer signals to the docking board 101A. The connection between the expansion board 120A and the docking board 101A is removable in the sense that the expansion board 120A, when removed from the docking board 101A, is not operatively coupled, does not receive power and/or control signal from the docking board 101A, and does not send data transfer signals to the docking board 101A. In one example, the docking board 101A provides the only source of power to the expansion board 120A and removing the expansion board 120A stops operation of the expansion board 120A to an extent that the expansion board 120A cannot operate alone without being operably connected to the docking board 101A.

In one implementation, the expansion board 110A or the expansion board 120A can connect directly to a power supply for board-level functions. The board-level functions refer to electronic operation performed by the expansion board 110A and in some instances do not include non-electronic operations (e.g., running a turbine engine) performed by the expansion board 110. In one example, all power used to operate the expansion board 110A can be provided directly by the power supply in form of the AC electric power and/or the DC electric power. In another example, a first part of the power used to operate the expansion board 120A can be provided directly by the power supply in form of the AC electric power and/or the DC electric power, and a second part of the power used to operate the expansion board 120A can be provided by an internal power supply (e.g., an energy harvesting device, a photovoltaic device, a lithium ion battery, an AC adaptor, etc.) integrated in the expansion board 120A.

In one implementation, the expansion board 110A or the expansion board 120A can be operatively couple to a peripheral device (e.g., a laser pointer, a GPS locator, etc.) from the set of peripheral devices 180A. The docking board 101A can be configured to send power in a first power configuration to the expansion board 110A when the expansion board 110A is connected to a first peripheral device (not shown). The docking board 101A can be configured to send power in a second power configuration to the expansion board 110A when the expansion board 110A is connected to a second peripheral device. In an example, the docking board 101A can be configured to send a 5 Volts DC electric power to the expansion board 110A when connected to a laser pointer peripheral device. In another example, the docking board 101A can be configured to send a 220 Volts AC electric power to the expansion board 110A when connected to a light detection and ranging (LiDAR) peripheral device.

In one implementation, the docking board 101A can be configured to send power in the first power configuration to the expansion board 110A when the expansion board 110A is connected to a peripheral device of a type. The type can refer to, for example, a technical standard, a quality standard, a security standard, a set of functional and/or technical characteristics, and/or a manufacturer. Additionally, the docking board 101A can be configured to send power in a second power configuration to the expansion board 110A when the expansion board 110A is connected to a peripheral device not of the type. In an example, the docking board 101A can be configured to send a 10-milliwatt electric power to the expansion board 110A when connected to a fifth generation (5G) type network board. In another example, the docking board 101A can be configured to send a 200-milliwatt electric power to the expansion board 110A when connected to a long term evolution (LTE) network board which is not of the 5G type network board.

As shown in FIG. 1A, the docking board 101A includes a first power filter 102A and a second power filter 103A. The docking board 101A can include a power conditioner (not shown) to connect the first power filter 102A to the expansion board 110A when connected to a first peripheral device 180A, and to connect the second power filter 103A to the expansion board 110A when connected to a second peripheral device 180A. The first power filter 102A and/or the second power filter 103A can be a printed circuit board including circuitry for filtering and/or power conversion such as, for example, electromagnetic interference (EMI) filter, low-pass filter, high-pass filter, band-path filter, AC-to-DC converter, voltage converter, and/or any other suitable electric circuitry for adjusting electric power levels, electric power types, and/or lowering electric power noises. In one example, the docking board 101A can be configured to select the first power filter 102A to send 12 Volts DC electric power to the expansion board 110A, when the expansion board 110A is not connected to any peripheral device. The docking board 101A can be configured further to select the second power filter 103A to send 110 Volts AC electric power to the expansion board 110A, when the expansion board 110A is connected to a peripheral device such as satellite communication receiver board.

The docking board 101A can receive a control signal from the expansion board 110A and/or the expansion board 120A and can send a control signal to the processor board 104A based on the control signal received from the expansion board 110A and/or 120A. In one example, the expansion board 120A can include a graphical processing unit (GPU) that performs a set of specialized modular arithmetic tasks faster than the CPU of the processor board 104A. The CPU can be configured to send a first set of control signals and a first data to the GPU to perform a series of modular arithmetic tasks. The GPU can be configured to perform the series of modular arithmetic tasks on the first data based on the first set of control signals and send a second data and a second set of control signals from the GPU to the CPU.

The docking board 101A is configured to be operatively disposed between the processor board 104A and the expansion board 110A when operatively coupled to the processor board 104A and operatively coupled to the expansion board 110A, such that the processor board 104A and the expansion board 110A do not exchange a signal without passing through the docking board 101A. In one example, the expansion board 110A can be a wireless communication board that receives and transmits data via radio frequency electromagnetic signals during operations. The processor board 104A send a set of signals, carrying data and/or control commands, to the docking board 101A to be directed to the expansion board 110A. The docking board 101A can receive the set of signals from the processor board 104A and direct the set of signals to the expansion board 110A to transmit the data via radio frequency electromagnetic signals.

The docking board 101A can authenticate the expansion board 110A in response to the expansion board 110A being operatively coupled to the docking board 101A. An authentication of the expansion board 110A can include exchanging power and/or a set of tokens between the expansion board 110A and the docking board 101A. The set of tokens can be for example a set of passwords, a set of codes, a set of electric signals, a set of electromagnetic signals, and/or the like. The docking board 101A can be configured to send a first power to the expansion board 110A in response to being operatively coupled to the docking board 101A and before authenticating the expansion board 110A. The first power can be a small amount of power sufficient to operate an authentication circuit on the expansion board 110A (e.g., an integrated circuit (IC) chip that performs the authentication). After authenticating the expansion board 110A, the docking board 101A can then send a second power to the expansion board 110A. The second power can be different than the first power and sufficient to operate the remaining portions of the expansion board 110A. The docking board 101A can send a control signal to the expansion board 110A after authenticating the expansion board 110A. The docking board 101A can further to not send the control signal to the expansion board before authenticating the expansion board 110A.

Similarly, the docking board 101A can authenticate the processor board 104A in response to the processor board 104A being operatively coupled to the docking board 101A. An authentication of the processor board 104A can include exchanging power and/or a set of tokens between the processor board 104A and the docking board 101A. The set of tokens can be for example a set of passwords, a set of codes, a set of electric signals, a set of electromagnetic signals, and/or the like. The docking board 101A can be configured to send a first power to the processor board 104A in response to being operatively coupled to the docking board 101A and before authenticating the processor board 104A. The first power can be a small amount of power sufficient to operate an authentication circuit on the processor board 104A. After authenticating the processor board 104A, the docking board 101A can then send a second power to the processor board 104A. The second power can be greater than the first power and sufficient to operate the remaining portions of the processor board 104A. The docking board 101A can further send a control signal to the processor board 104A after authenticating the processor board 104A. The docking board 101A can further choose to not send the control signal to the expansion board before authenticating the processor board 104A.

Figure 1B:
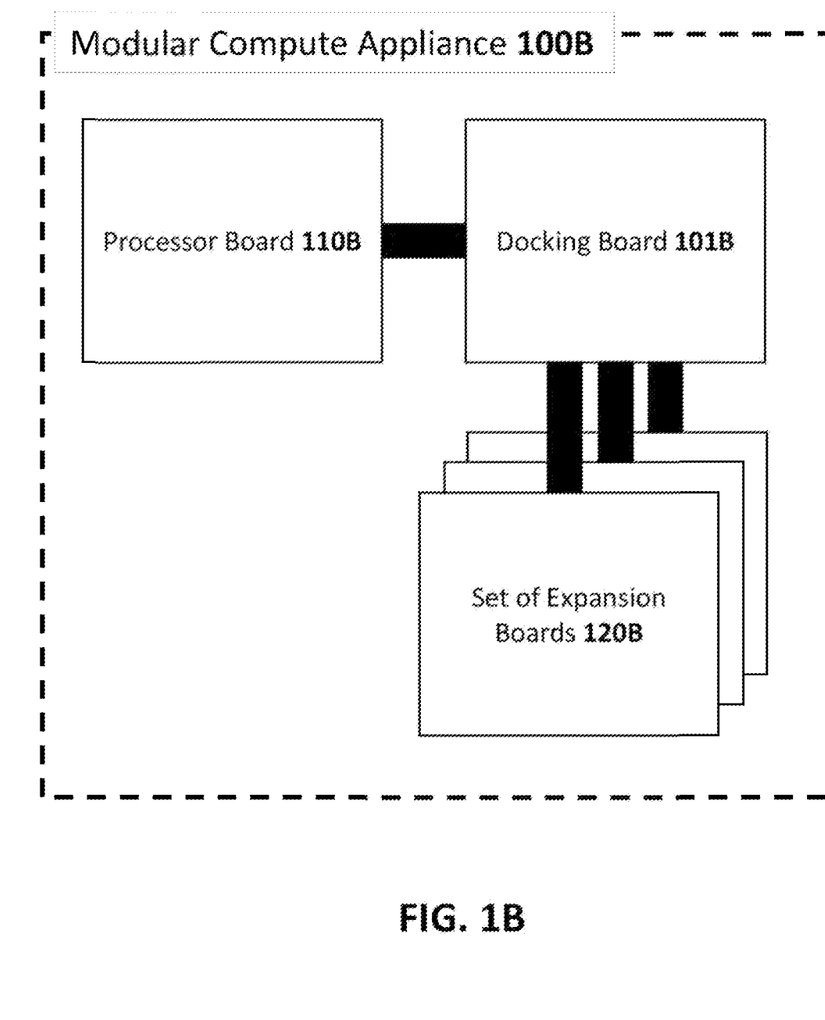
FIG. 1B is a schematic description of a portable computer, according to an embodiment.

FIG. 1B is a schematic description of a modular compute appliance (also referred to herein as a "portable computer") 100B, according to an embodiment. The modular compute appliance 100B includes a docking board 101B (similar to the docking board 101A described above with respect to FIG. 1A) used to send power (e.g., a direct current (DC) electric power, an alternating current (AC) electric power, etc.) and receive a set of signals (e.g., a DC electric signal, an AC electric signal, an radio frequency (RF) signal etc.) in response to a processor board (e.g., a central processing unit (CPU) board, etc.) or an expansion board (e.g., a memory board, etc.). The modular compute appliance 100B includes, in addition to the docking board 101B, a set of function-based boards such as, for example, a processor board 110B (similar to the processor board 104A described above with respect to FIG. 1A), and a set of expansion boards 120B. The modular compute appliance 100B can be connected to a set of readers (not shown here and similar to the set of readers 180A described above with respect to FIG. 1A) via a connector.

The set of expansion boards 120B can be, for example, a hardware based integrated circuit (IC) board, a printed circuit board (PCB), or any other suitable electronic board configured to provide at least one specialized functionally. In one embodiment, each expansion board from the set of expansion boards 120B can have a single specialized function such as, for example, networking, storage, and/or the like. In one embodiment, each expansion board from the set of expansion boards 120B can have multiple functions such as, for example, networking and streaming, both storage and authenticating, and/or the like. Having flexibility of having one or more functions on the set of expansion boards 120B enables flexibility and cost effectiveness in circuit design and in system design. Each expansion board from the set of expansion boards 120B can be configured to establish a connection to the docking board 101B via a high SI power and signal connectors.

One or more expansion boards from the set of expansion boards 120B can be memory boards configured to be removably coupled to the docking board 101B. Each memory board can be, for example, a memory buffer, a random access memory (RAM), a read-only memory (ROM), a hard drive, a flash drive, a secure digital (SD) memory card, a compact disk (CD), an external hard drive, an erasable programmable read-only memory (EPROM), an embedded multi-time programmable (MTP) memory, an embedded multi-media card (eMMC), a universal flash storage (UFS) device, and/or the like. Each memory board can store, for example, one or more software boards and/or code that includes instructions to cause a processor (such as the processor board 110B) to perform control procedures, arithmetic procedures, and/or logical procedures.

One or more expansion boards from the set of expansion boards 120B can be communication interface boards configured to be removably coupled to the docking board 101B, and configured to connect the docking board 101B the processor board 110B, and/or an expansion board from the set of expansion boards 120B to a network. Each communication interface board can be, for example, a network interface card (NIC), a Wi-Fi™ board, a Bluetooth® board, an optical communication board, and/or any other suitable wired and/or wireless communication interface. In some instances, each communication interface board can facilitate receiving or transmitting data via the network. More specifically, in some implementations, each communication interface board can facilitate receiving or transmitting data through the network from or to a modular compute appliance.

The network can be a digital telecommunication network of servers and/or compute devices. The servers and/or computes device on the network can be connected via one or more wired or wireless communication networks (not shown) to share resources such as, for example, data storage or computing power. The wired or wireless communication networks between servers and/or compute devices of the network can include one or more communication channels, for example, a radio frequency (RF) communication channel(s), an extremely low frequency (ELF) communication channel(s), an ultra-low frequency (ULF) communication channel(s), a low frequency (LF) communication channel(s), a medium frequency (MF) communication channel(s), an ultra-high frequency (UHF) communication channel(s), an extremely high frequency (EHF) communication channel(s), a fiber optic commination channel(s), an electronic communication channel(s), a satellite communication channel(s), and/or the like. The network can be, for example, the Internet, an intranet, a local area network (LAN), a wide area network (WAN), a metropolitan area network (MAN), a worldwide interoperability for microwave access network (WiMAX®), a virtual network, any other suitable communication system and/or a combination of such networks.

One or more expansion boards from the set of expansion boards 120B can be sound interface boards configured to be removably coupled to the docking board 101B, and configured to provide audio signals to and from the docking board 101B the processor board 110B, and/or an expansion board from the set of expansion boards 120B. Each sound interface board can be, for example, a consumer-grade sound interface board, an environmental audio expansion, a sound interface board with analog-to-digital (AD) and digital-to-analog (DA) converters, a high-definition sound interface, and/or the like. In some instances, each sound interface board can facilitate receiving or transmitting audio signals via a peripheral device (e.g., a microphone, a speaker, etc.). More specifically, in some implementations, a sound interface board can receive and/or transmit audio signals from or to the docking board 101B connected to the peripheral device configured to receive and/or transmit audio signals from or to the docking board 101B. In some implementations, a sound interface board can include an integrated peripheral unit (e.g., a microphone, a speaker, etc.) to receive and/or transmit audio signals from or to a user, and further configured to receive and/or transmit the audio signals to the docking board 101B.

One or more expansion boards from the set of expansion boards 120B can be graphic interface boards configured to be removably coupled to the docking board 101B, and configured to provide signals to and from the docking board 101B the processor board 110B, and/or an expansion board from the set of expansion boards 120B. Each graphic interface board can be connected to the docking board 101B via, for example, an industry standard architecture (ISA), peripheral component interconnect (PCI), peripheral component interconnect extended (PCI-X), accelerated graphics port (AGP), and/or the like. Each graphic interface board can be connected to a peripheral device (e.g., a monitor, a projector, a television, etc.) via, for example, a video graphics array (VGA) connector, high-definition multimedia interface (HDMI) and/or the like. In some implementations, a graphic interface board can receive and/or transmit video signals from or to the docking board 101B connected to a peripheral device configured to receive and/or transmit video signals from or to the docking board 101B. In some implementations, a graphic interface board can include an integrated peripheral unit (e.g., a display, a camera, etc.) to receive and/or transmit video signals from or to a user, and further configured to receive and/or transmit the video signals to the docking board 101B.

One or more expansion boards from the set of expansion boards 120B can be encryption boards configured to be removably coupled to the docking board 101B, and configured to provide signals to and from the docking board 101B, the processor board 110B, and/or an expansion board from the set of expansion boards 120B. In some implementation, an encryption board can be a hardware-based encryption board operatively connected to the docking board 101B. In one example, the hardware-based encryption board can operate individually to encrypt a message received, via the docking board 101B, from a processor board. In another example, the hardware-based encryption board can operate together with a set of software codes being executed at the processor board.

One or more expansion boards from the set of expansion boards 120B can be a sensor fusion board configured to be removably coupled to the docking board 101B, and configured to provide signals to and from the docking board 101B, the processor board 110B, and/or an expansion board from the set of expansion boards 120B. In one example the sensor fusion board is light detection and ranging (LiDAR) board including a set of light emitters and a set of light sensors collectively configured to detect objects in the three dimensional space surrounding the LiDAR board. The sensor fusion board can be configured to send sensor data, via the docking board 101B, to the processor board and further receive a set of instruction from the processor board.

Figure 2:
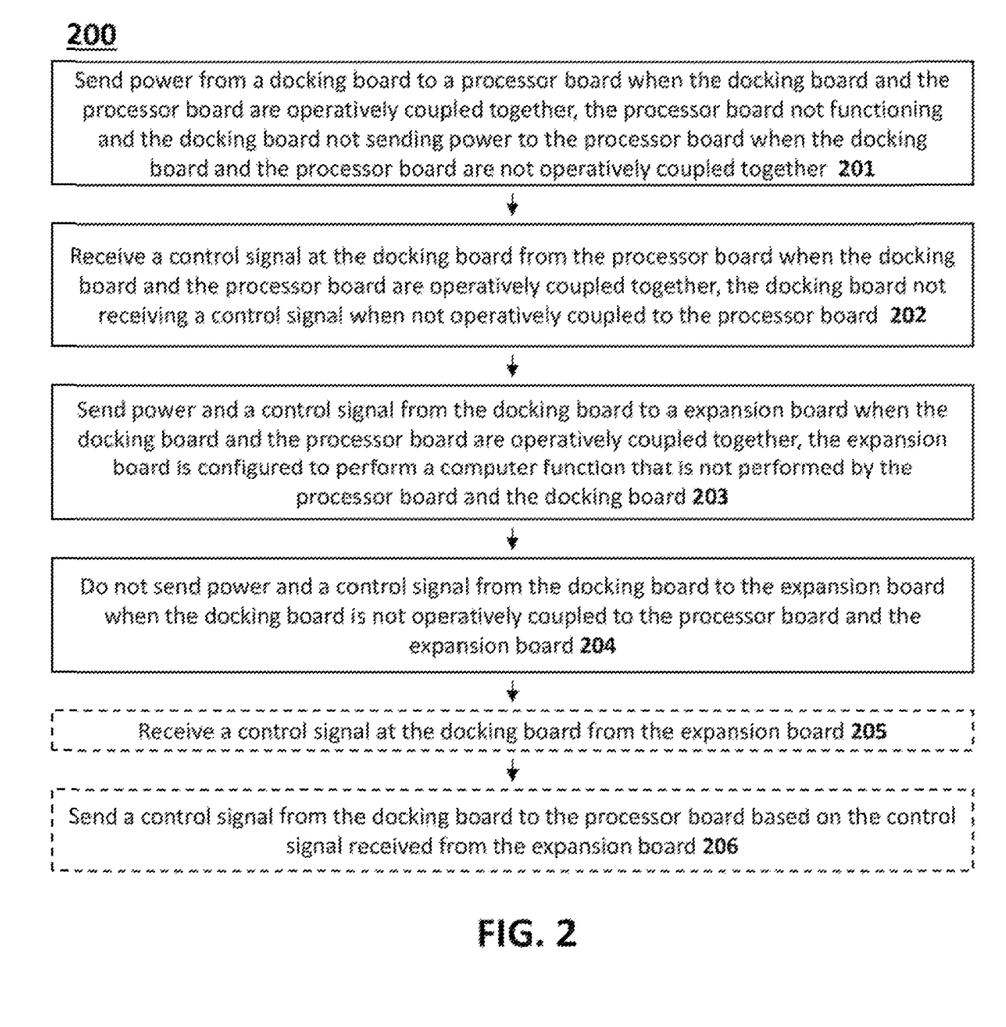
FIG. 2 is a flowchart illustrating a method of operating a portable computer, according to an embodiment.

FIG. 2 is a flowchart illustrating a method 200 of operating a portable computer (e.g., portable computer 100A described above with respect to FIG. 1A), according to an embodiment. As shown in FIG. 2, at 201, power is sent from a docking board (similar to the docking board 101A described above with respect to FIG. 1A) to a processor board (similar to the processor board 104A described above with respect to FIG. 1A) when the docking board and the processor board are operatively coupled together. The processor board does not function and the docking board does not send power to the processor board when the docking board and the processor board are not operatively coupled together. At 202, a control signal is received at the docking board from the processor board when the docking board and the processor board are operatively coupled together. The docking board does not receive a control signal when not operatively coupled to the processor board. At 203, power and a control signal is sent from the docking board to an expansion board (similar to the expansion board 110A and/or the expansion board 120A described above with respect to FIG. 1A) when the docking board and the processor board are operatively coupled together. The expansion board can perform a computer function that is not performed by the processor board and the docking board. At 204, power and a control signal is not sent from the docking board to the expansion board when the docking board is not operatively coupled to the processor board and the expansion board. The docking board, the processor board, and the expansion board collectively define a portable computer when the docking board is operatively coupled to the processor board and the expansion board. Optionally, at 205, a control signal can be received at the docking board from the expansion board. Also, optionally, at 206, a control signal can be sent from the docking board to the processor board based on the control signal received from the expansion board. The method 200 is explained in greater detail below.

At 201, the docking board sends power to a processor board when the docking board and the processor board are operatively coupled together. The processor board does not function and the docking board does not send power to the processor board when the docking board and the processor board are not operatively coupled together. The docking board, when operatively coupled to the processor board, sends power to the processor board in a power configuration. The power configuration is defined by an electromagnetic medium requirement, a wattage requirement, a voltage requirement, and/or a current requirement. The power configuration can be for example, a direct current (DC) electric power requirement and 5 volts of voltage requirement, an alternating current (AC) electric power requirement with 100 milliwatts of wattage requirement, an electromagnetic induction power requirement, and/or the like. The docking board, when not operatively coupled to the processor board, does not send power to the processor board in a power configuration.

In one example, the docking board and the processor board each includes a set of electrically conducting pins when the electrically conducting pins are not in physical contact to conduct electric current, the docking board and the processor board are not operatively coupled, the docking board does not direct electric power to the processor board, and the processor board does not function. When the docking board and the processor board are connected together via an electric medium (such as the pins), the docking board transmits a first token, via the electric medium, to the processor board, and the processor boards transmits a second token, via the electric medium, to the processor board. If the first token does not authenticate the docking board to the processor board and/or if the second token does not authenticate the processor board to the docking board, the processor board does not operatively connect to the docket board, and the docking board does not send power to the processor board.

At 202, the docking board receives a control signal from the processor board when the docking board and the processor board are operatively coupled together. The docking board does not receive a control signal when not operatively coupled to the processor board. In one example, the control signal can be a DC electric current or an AC electric current sent from the processor board to the docking board, so that the docking board performs an operation in response to receiving the control signal. In another example, the control signal can be a set of radio frequency (RF) electromagnetic (EM) waves sent from the processor board to the docking board to perform a set of operations in response to receiving the RF EM waves.

At 203, the docking board sends power and a control signal to the expansion board when the docking board and the processor board are operatively coupled together. The expansion board can perform a computer function that is not performed by the processor board and the docking board.

The docking board provides power to operate the processor board and the expansion board, when the docking board is operatively coupled to the processor board and expansion board. The computer function performed by the expansion board can be, for example, a networking function, an additional storage function, an additional encryption function, a virtual reality function. The control signal sent from the docking board to the expansion board can be generated in the docking board or can be directed from the processor board to the expansion board through the docketing board. In some implementations, power and the control signal can be sent from the docking board to the expansion board via a common connection medium (e.g., a USB connection, a thunderbolt connection, etc.).

In some instances, the computer function performed by the expansion board can be a set of electrically driven circuit operations that are different from the operation of the processor board. For example, the computer function performed by the expansion board can generate sound signals in a sound interface board, generate graphic signals in a graphic interface board, encrypt data using a specialized encryption board, generate a representation of a three-dimensional space using a sensor fusion board, detect an object with high reliability and accuracy using a LiDAR board, and so forth. In some other instances, the computer function performed by the expansion board can be a set of electrically driven circuit operations that are the same as or similar to the operation of the processor board that further improves or expands performance of the processor board. For example, the compute function performed by the expansion board can be additional processing core that enhances the processing power of the processor board, additional memory that expands capacity of memory on the processor board, additional networking boards that enable transmitting and receiving new telecommunication standards (e.g. 5G, 6G, etc.), and so forth.

At 204, the docking board does not send power and a control signal to the expansion board when the docking board is not operatively coupled to the processor board and the expansion board. In one example, the docking board, the processor board, and the expansion board each includes a set of electrically conducting pins that are not in physical contact to conduct electric current when the boards are not connected together. Thus, the docking board and the processor board are not operatively coupled and/or the docking board and the expansion board are not operatively coupled when the boards are not connected together. As a result, the docking board does not send power and the control signal to the expansion board, and the expansion board does not work when the boards are not connected together.

At 205, the docking board optionally receives a control signal from the expansion board. The control signal can be, for example, a DC electric current or an AC electric current sent from the expansion board to the docking board to perform an operation, a set of radio frequency (RF) electromagnetic waves sent from the expansion board to the docking board to perform a set of operations, and/or the like. In one example, the expansion board can be a task-specific processor board to perform a series of arithmetic and/or logical operations of a specific task more quickly and/or cost effectively compared to the processor board. The specific task performed by the task-specific processor board can result in the generation of a specific task control signal. At 206, the docking board optionally sends a control signal to the processor board based on the control signal received from the expansion board. In one example, the expansion board can send the specific task control signal to the docking board, and the docking board can re-send the specific task control signal to the processor board or any other boards operatively connected to the docking board.

The docking board, the processor board, and the expansion board collectively define a portable computer when the docking board is operatively coupled to the processor board and the expansion board. The portable computer can process information (e.g., using the processor board), can store information (e.g., using a storage expansion board), can receive and/or transmit information (e.g., using a networking expansion board), and perform any other additional computing operation via an additional expansion board(s) capable being operatively connected to the docking board. The expansion board(s) (also referred to herein as "function-based boards") can have different portable sizes (e.g., size of a credit card, size of a smartphone screen, etc.) and can be removably coupled to the docking board.

Figure 3:
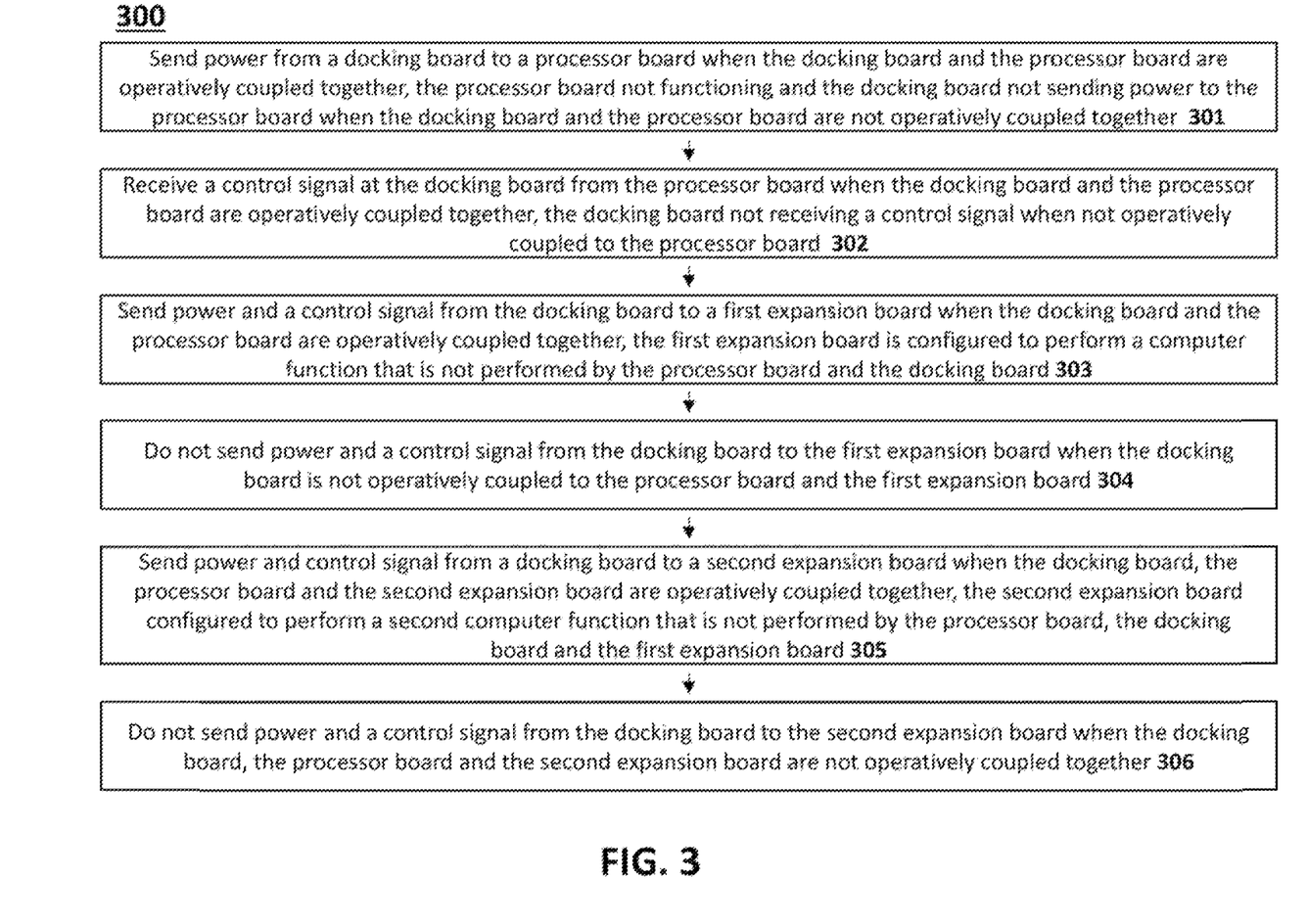
FIG. 3 is a flowchart illustrating a method of operating a portable computer, according to an embodiment.

FIG. 3 is a flowchart illustrating a method 300 of operating a portable computer (e.g., portable computer 100A described above with respect to FIG. 1A), according to an embodiment. As shown in FIG. 3, at 301, power is sent from a docking board (similar to the docking board 101A described above with respect to FIG. 1A) to a processor board (similar to the processor board 104A described above with respect to FIG. 1A) when the docking board and the processor board are operatively coupled together. The processor board does not function and the docking board does not send power to the processor board when the docking board and the processor board are not operatively coupled together. The docking board sends power to the processor board for example via the method shown and described above with reference to FIG. 2. At 302, a control signal is received at the docking board from the processor board when the docking board and the processor board are operatively coupled together. The docking board does not receive a control signal when not operatively coupled to the processor board. The docking board receives the control signal from the processor board, for example, via the method shown and described above with reference to FIG. 2. At 303, power and a control signal is sent from the docking board to a first expansion board (e.g., expansion board 110A described above with respect to FIG. 1A) when the docking board and the processor board are operatively coupled together. The first expansion board is configured to perform a computer function that is not performed by the processor board and the docking board. The docking board sends power and the control signal to the expansion board, for example, via the method shown and described above with reference to FIG. 2. At 304, power and a control signal are not sent from the docking board to the first expansion board when the docking board is not operatively coupled to the processor board and the first expansion board. The docking board does not send power and the control signal from the docking board to the expansion board, for example, via the method shown and described above with reference to FIG. 2. The docking board, the processor board and the first expansion board collectively define a portable computer when the docking board is operatively coupled to the processor board and the first expansion board. At 305, power and a control signal is sent from a docking board to a second expansion board (e.g., the expansion board 120A described above with respect to FIG. 1A) when the docking board, the processor board, and the second expansion board are operatively coupled together. The second expansion board performs a second computer function that is not performed by the processor board, the docking board and the first expansion board. At 306, power and a control signal are not sent from the docking board to the second expansion board when the docking board, the processor board and the second expansion board are not operatively coupled together. The docking board, the processor board, the first expansion board, and the second expansion board collectively defining the portable computer in a second configuration when the docking board, the processor board, the first expansion board and the second expansion board are operatively coupled together. The method 300 is explained in greater detail below.

At 305, the docking board sends power and a control signal to a second expansion board when the docking board, the processor board, and the second expansion board are operatively coupled together. The second expansion board performs a second computer function that is not performed by the processor board, the docking board and the first expansion board. The docking board provides power to operate the processor board, the first expansion board, and the second expansion board when the docking board is operatively coupled to the processor board. The computer function performed by the expansion board can be, for example, a sound interface board, a graphic interface board, and/or the like. The control signal sent from the docking board to the second expansion board can be generated in the docking board or can be directed from the processor board, or the first expansion board to the second expansion board.

At 306, the docking board does not send power and a control signal to the second expansion board when the docking board, the processor board and the second expansion board are not operatively coupled together. In one example, the docking board, the processor board, the first expansion board, and the second expansion board each includes a set of electrically conducting pins that are not in physical contact when the docking board, the processor board are not couple together, the first expansion board and the second expansion board. Thus, the docking board and the processor board are not operatively coupled, the docking board and the first expansion board are not operatively coupled, and the docking board and the second expansion board are not operatively coupled. As a result, the docking board does not send power and the control signal to the second expansion board, and the second expansion board does not work.

Figure 4:
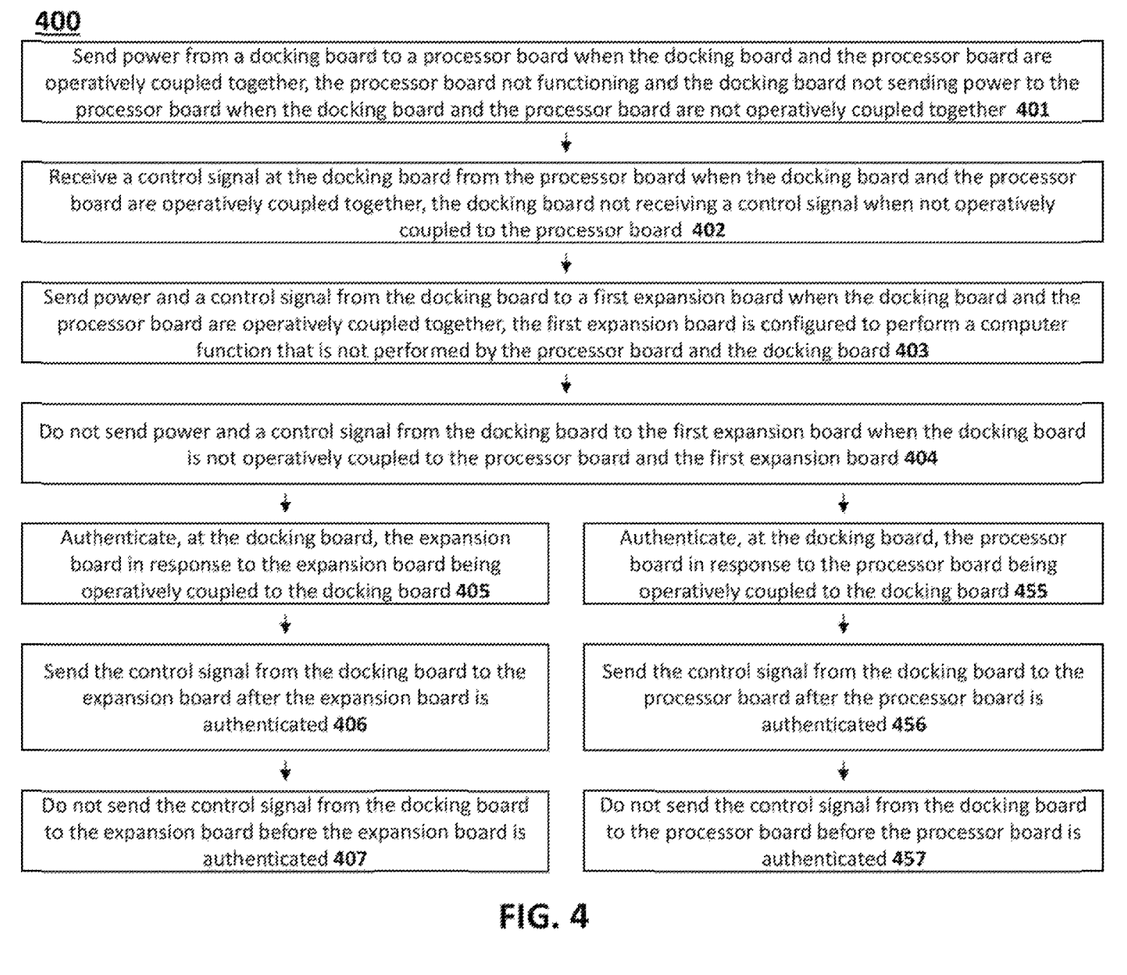
FIG. 4 is a flowchart illustrating a method of operating a portable computer, according to an embodiment.

FIG. 4 is a flowchart illustrating a method 400 of operating a portable computer (e.g., portable computer 100A described above with respect to FIG. 1A), according to an embodiment. As shown in FIG. 4, at 401, power is sent from a docking board (e.g., docking board 101A described above with respect to FIG. 1A) to a processor board (e.g., processor board 104A described above with respect to FIG. 1A) when the docking board and the processor board are operatively coupled together. The processor board does not function, and the docking board does not send power to the processor board when the docking board and the processor board are not operatively coupled together. The docking board can send power to the processor board via, for example, the method shown and described above with reference to FIG. 2. At 402, receiving a control signal is received at the docking board from the processor board when the docking board and the processor board are operatively coupled together. The docking board not receiving a control signal when not operatively coupled to the processor board. The docking board receives the control signal from the processor board via, for example, the method shown and described above with reference to FIG. 2. At 403, power and a control signal are sent from the docking board to an expansion board (e.g., expansion board 110A and/or the expansion board 120A described above with respect to FIG. 1A) when the docking board and the processor board are operatively coupled together. The expansion board is configured to perform a computer function that is not performed by the processor board and the docking board. The docking board sends power and the control signal to the expansion board via, for example, the method shown and described above with reference to FIG. 2. At 404, power and a control signal are not sent from the docking board to the expansion board when the docking board is not operatively coupled to the processor board and the expansion board. The docking board, the processor board, and the expansion board collectively define a portable computer when the docking board is operatively coupled to the processor board and the expansion board. The docking board does not send power and the control signal from the docking board to the expansion board via, for example, the method shown and described above with reference to FIG. 2. At 405, the expansion board is authenticated at the docking board in response to the expansion board being operatively coupled to the docking board. At 406, the control signal is sent from the docking board to the expansion board after the expansion board is authenticated. At 407, the control signal is not sent from the docking board to the expansion board before the expansion board is authenticated. At 455, the processor board is authenticated at the docking board in response to the processor board being operatively coupled to the docking board. At 456, the control signal is sent from the docking board to the processor board after the processor board is authenticated. At 457, the control signal is not sent from the docking board to the processor board before the processor board is authenticated. The method 400 is explained in greater detail below.

At 405, the docking board authenticates the expansion board in response to the expansion board being operatively coupled to the docking board. In one implementation, an authentication of the expansion board can include exchanging a set of tokens between the expansion board and the docking board. The set of tokens can be, for example, a set of passwords, a set of codes, a set of electric signals, a set of electromagnetic signals, and/or the like. At 406, the docking board sends the control signal to the expansion board after the expansion board is authenticated. In one implementation, the docking board directs the control signal generated in the processor board to the expansion board, after the expansion board and the docking board exchange the set of token to confirm that the expansion board is authentic and is compatible with the docking board. At 407, the docking board does not send the control signal to the expansion board before the expansion board is authenticated. In one example, the docking board does not send any signal to the expansion board or does not direct any signal from the processor board to the expansion board before the set of tokens authenticate the expansion board.

At 455, the docking board authenticates the processor board in response to the processor board being operatively coupled to the docking board. In one implementation, an authentication of the processor board can include exchanging a set of tokens between the processor board and the docking board. The set of tokens can be, for example, a set of passwords, a set of codes, a set of electric signals, a set of electromagnetic signals, and/or the like. At 456, the docking board sends the control signal to the processor board after the processor board is authenticated. In one implementation, the docking board sends the control signal generated in the docking board or the expansion board to the processor board, after the processor board and the docking board exchange the set of token to confirm that the processor board is authentic and is compatible with the docking board. At 457, the docking board does not send the control signal to the processor board before the processor board is authenticated. In one example, the docking board does not send signals to the processor board before the set of tokens authenticate the processor board.

It should be understood that the disclosed embodiments are not representative of all claimed innovations. As such, certain aspects of the disclosure have not been discussed herein. That alternate embodiments may not have been presented for a specific portion of the innovations or that further undescribed alternate embodiments may be available for a portion is not to be considered a disclaimer of those alternate embodiments. Thus, it is to be understood that other embodiments can be utilized, and functional, logical, operational, organizational, structural and/or topological modifications may be made without departing from the scope of the disclosure. As such, all examples and/or embodiments are deemed to be non-limiting throughout this disclosure.

Some embodiments described herein relate to methods. It should be understood that such methods can be computer implemented methods (e.g., instructions stored in memory and executed on processors). Where methods described above indicate certain events occurring in certain order, the ordering of certain events can be modified. Additionally, certain of the events can be performed repeatedly, concurrently in a parallel process when possible, as well as performed sequentially as described above. Furthermore, certain embodiments can omit one or more described events.

All definitions, as defined and used herein, should be understood to control over dictionary definitions, definitions in documents incorporated by reference, and/or ordinary meanings of the defined terms.

Examples of computer code include, but are not limited to, micro-code or micro-instructions, machine instructions, such as produced by a compiler, code used to produce a web service, and files containing higher-level instructions that are executed by a computer using an interpreter. For example, embodiments can be implemented using Python, Java, JavaScript, C++, and/or other programming languages and development tools. Additional examples of computer code include, but are not limited to, control signals, encrypted code, and compressed code.

The drawings primarily are for illustrative purposes and are not intended to limit the scope of the subject matter described herein. The drawings are not necessarily to scale; in some instances, various aspects of the subject matter disclosed herein can be shown exaggerated or enlarged in the drawings to facilitate an understanding of different features. In the drawings, like reference characters generally refer to like features (e.g., functionally similar and/or structurally similar elements).

The acts performed as part of a disclosed method(s) can be ordered in any suitable way. Accordingly, embodiments can be constructed in which processes or steps are executed in an order different than illustrated, which can include performing some steps or processes simultaneously, even though shown as sequential acts in illustrative embodiments. Put differently, it is to be understood that such features may not necessarily be limited to a particular order of execution, but rather, any number of threads, processes, services, servers, and/or the like that may execute serially, asynchronously, concurrently, in parallel, simultaneously, synchronously, and/or the like in a manner consistent with the disclosure. As such, some of these features may be mutually contradictory, in that they cannot be simultaneously present in a single embodiment. Similarly, some features are applicable to one aspect of the innovations, and inapplicable to others.

Where a range of values is provided, it is understood that each intervening value, to the tenth of the unit of the lower limit unless the context clearly dictates otherwise, between the upper and lower limit of that range and any other stated or intervening value in that stated range is encompassed within the disclosure. That the upper and lower limits of these smaller ranges can independently be included in the smaller ranges is also encompassed within the disclosure, subject to any specifically excluded limit in the stated range. Where the stated range includes one or both of the limits, ranges excluding either or both of those included limits are also included in the disclosure.

The phrase "and/or," as used herein in the specification and in the embodiments, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements can optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the embodiments, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the embodiments, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of," or "exactly one of." "Consisting essentially of," when used in the embodiments, shall have its ordinary meaning as used in the field of patent law.

As used herein in the specification and in the embodiments, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements can optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the embodiments, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed is:

1. A method, comprising:
    sending power from a docking board to a processor board when the docking board and the processor board are operatively coupled together, the processor board not functioning and the docking board not sending power to the processor board when the docking board and the processor board are not operatively coupled together;
    receiving a control signal at the docking board from the processor board when the docking board and the processor board are operatively coupled together, the docking board not receiving a control signal when not operatively coupled to the processor board;
    sending power from the docking board to an expansion board when the docking board and the processor board are operatively coupled together, the expansion board is configured to perform a computer function that is not performed by the processor board and the docking board;
    sending a control signal from the docking board to the expansion board after the expansion board authenticates itself in response to receiving the power from the docking board; and
    not sending power and a control signal from the docking board to the expansion board when the docking board is operatively coupled to the expansion board and not operatively coupled to the processor board.

2. The method of claim 1, wherein the expansion board is a first expansion board, the computer function is a first computer function, further comprising:
    sending power and a control signal from the docking board to a second expansion board when the docking board, the processor board and the second expansion board are operatively coupled together, the second expansion board configured to perform a second computer function that is not performed by the processor board, the docking board and the first expansion board; and
    not sending power and a control signal from the docking board to the second expansion board when the docking board, the processor board and the second expansion board are not operatively coupled together,
    the docking board, the processor board, the first expansion board and the second expansion board collectively defining the portable computer in a second configuration when the docking board, the processor board, the first expansion board and the second expansion board are operatively coupled together.

3. The method of claim 1, wherein:
    the docking board includes a first power filter and a second power filter,
    sending the power from the docking board to the expansion board includes sending, via the first power filter, the power in a first configuration to the expansion board when the expansion board is operatively coupled to a peripheral device of a type,
    sending, via the second power filter, the power in a second configuration to the expansion board when the expansion board is not operatively coupled to a peripheral device of the type.

4. The method of claim 1, wherein sending the control signal from the docking board to the expansion board is further based on the control signal received by the docking board from the processor board.

5. The method of claim 1, further comprising:
    receiving a control signal at the docking board from the expansion board based on the control signal sent from the docking board to the expansion board; and
    sending a control signal from the docking board to the processor board based on the control signal received from the expansion board.

6. The method of claim 1, wherein the docking board, when operatively coupled to the processor board and the expansion board, is operatively disposed between the processor board and the expansion board such that the processor board and the expansion board do not exchange a signal without passing through the docking board.

7. The method for claim 1, wherein the power sent from the docking board to the processor board is a first power, the method further comprising:
    sending a second power from the docking board to the processor board after the processor board authenticates itself in response to receiving the first power, the second power being different than the first power.

8. The method for claim 1, wherein the power sent from the docking board to the processor board is a first power that is sent to an authentication circuit of the processor board that prevents at least a portion of the first power from being sent to remaining portions of the processor board until the processor board is authenticated by the authentication circuit, the method further comprising:
    receiving an indication that the authentication circuit of the processor board authenticated the processor board; and
    sending a second power from the docking board to the processor board after the authentication circuit authenticated the processor board, the second power being different than the first power.

9. A method, comprising:
    sending a first power from a docking board to a processor board when the docking board and the processor board are operatively coupled together, the processor board not functioning and the docking board not sending power to the processor board when the docking board and the processor board are not operatively coupled together;
    sending a second power from the docking board to the processor board after the processor board authenticates itself in response to receiving the first power, the second power being different than the first power;
    receiving a control signal at the docking board from the processor board when the docking board and the processor board are operatively coupled together, the docking board not receiving a control signal when not operatively coupled to the processor board;

sending power and a control signal from the docking board to an expansion board when the docking board and the processor board are operatively coupled together, the expansion board is configured to perform a computer function that is not performed by the processor board and the docking board; and not sending power and a control signal from the docking board to the expansion board when the docking board is operatively coupled to the expansion board and not operatively coupled to the processor board.

10. The method of claim 9, wherein the expansion board is a first expansion board, the computer function is a first computer function, further comprising:

sending power and a control signal from the docking board to a second expansion board when the docking board, the processor board and the second expansion board are operatively coupled together, the second expansion board configured to perform a second computer function that is not performed by the processor board, the docking board and the first expansion board; and not sending power and a control signal from the docking board to the second expansion board when the docking board, the processor board and the second expansion board are not operatively coupled together, the docking board, the processor board, the first expansion board and the second expansion board collectively defining the portable computer in a second configuration when the docking board, the processor board, the first expansion board and the second expansion board are operatively coupled together.

11. The method of claim 9, wherein:

the docking board includes a first power filter and a second power filter, sending the power from the docking board to the expansion board includes sending, via the first power filter, the power in a first configuration to the expansion board when the expansion board is operatively coupled to a peripheral device of a type, sending, via the second power filter, the power in a second configuration to the expansion board when the expansion board is not operatively coupled to a peripheral device of the type.

12. The method of claim 9, wherein sending the control signal from the docking board to the expansion board is further based on the control signal received by the docking board from the processor board.

13. The method of claim 9, further comprising:

receiving a control signal at the docking board from the expansion board based on the control signal sent from the docking board to the expansion board; and sending a control signal from the docking board to the processor board based on the control signal received from the expansion board.

14. The method of claim 9, wherein the docking board, when operatively coupled to the processor board and the expansion board, is operatively disposed between the processor board and the expansion board such that the processor board and the expansion board do not exchange a signal without passing through the docking board.

15. The method for claim 9, wherein the first power sent from the docking board to the processor board is sent to an authentication circuit of the processor board that prevents at least a portion of the first power from being sent to remaining portions of the processor board until the processor board is authenticated by the authentication circuit.

16. A system, comprising:

a docking board configured to be removably coupled to (1) a processor board having a processor and not functioning when not operatively coupled to the docking board, and (2) an expansion board configured to perform a computer function that is not performed by the processor board, the docking board configured to send a first power to the processor board when the docking board is operatively coupled to the processor board, the docking board configured to send a second power to and receive a control signal from the processor board after the processor board authenticates itself in response to receiving the first power, the docking board configured to not send power to and not receive a control signal from the processor board when the docking board is not operatively coupled to the processor board, the docking board configured to send power to the expansion board when the docking board is operatively coupled to the processor board and the expansion board, the docking board configured to send a control signal after the expansion board authenticates itself in response to receiving the power, the docking board configured to not send power and not send a control signal to the expansion board when the docking board is operatively coupled to the expansion board and not operatively coupled to the processor board.

17. The system of claim 16, wherein the expansion board is a first expansion board, the computer function is a first computer function, the system further comprising:

a second expansion board that does not perform the first computer function and that is configured to be removably coupled to the docking board, the second expansion board configured to perform a second computer function that is not performed by the processor board, the docking board and the first expansion board, the docking board configured to send power and a control signal to a second expansion board when the docking board is operatively coupled to the processor board and the second expansion board, the docking board configured to not send power and not send a control signal to the second expansion board when the docking board is operatively coupled to the second expansion board and not operatively coupled to the processor board, and the docking board, the processor board, the first expansion board and the second expansion board collectively defining a portable computer when the docking board is operatively coupled to the processor board, the first expansion board and the second expansion board.

18. The system of claim 16, wherein the docking board is configured to send the power in a first configuration to the expansion board when the expansion board is operatively coupled to a peripheral device of a type and configured to send the power in a second configuration to the expansion board when the expansion board is not operatively coupled to a peripheral device of the type.

19. The system of claim 16, wherein the docking board is configured to receive a control signal from the expansion board and configured to send a control signal to the processor board based on the control signal received from the expansion board.

20. The system of claim 16, wherein the docking board, when operatively coupled to the processor board and the expansion board, is operatively disposed between the processor board and the expansion board such that the processor board and the expansion board do not exchange a signal without passing through the docking board.

* * * * *